United States Patent
Kikuyama et al.

(10) Patent No.: US 7,175,823 B2
(45) Date of Patent: Feb. 13, 2007

(54) PURIFICATION METHOD FOR PRODUCING HIGH PURITY NIOBIUM COMPOUND AND/OR TANTALUM COMPOUND

(75) Inventors: Hirohisa Kikuyama, Izumiootsu (JP); Masahide Waki, Izumiootsu (JP); Hiroto Izumi, Izumiootsu (JP); Hirofumi Yazaki, Izumiootsu (JP); Kenji Aoki, Izumiootsu (JP); Shinji Hashiguchi, Izumiootsu (JP); Masatsugu Kawawaki, Izumiootsu (JP); Yuko Murakami, Izumiootsu (JP)

(73) Assignee: Stella Chemifa Kabushiki Kaisha, Osaka (JP)

( * ) Notice: Subject to any disclaimer, the term of this patent is extended or adjusted under 35 U.S.C. 154(b) by 48 days.

(21) Appl. No.: 10/505,802

(22) PCT Filed: Feb. 27, 2003

(86) PCT No.: PCT/JP03/02226

§ 371 (c)(1),
(2), (4) Date: Oct. 7, 2004

(87) PCT Pub. No.: WO03/072505

PCT Pub. Date: Sep. 4, 2003

(65) Prior Publication Data

US 2005/0255035 A1      Nov. 17, 2005

(30) Foreign Application Priority Data

Feb. 27, 2002  (JP)  ............................. 2002-052413
Mar. 5, 2002   (JP)  ............................. 2002-059164

(51) Int. Cl.
*C01G 33/00*  (2006.01)
*C01G 35/00*  (2006.01)

(52) U.S. Cl. ................. 423/464; 423/65; 423/489; 423/594.17

(58) Field of Classification Search ............. 423/464, 423/489, 65, 66, 67, 594.17, 463
See application file for complete search history.

(56) References Cited

U.S. PATENT DOCUMENTS

| | | | |
|---|---|---|---|
| 2,962,327 A | | 11/1960 | Benevall |
| 3,072,459 A | * | 1/1963 | Foos et al. ............... 423/64 |
| 4,164,417 A | * | 8/1979 | Gustison ................. 420/425 |
| 5,194,232 A | * | 3/1993 | Bludssus et al. .......... 423/65 |
| 5,209,910 A | * | 5/1993 | Bludssus et al. .......... 423/63 |
| 5,385,713 A | * | 1/1995 | Carlson .................. 423/11 |
| 6,592,830 B1 | * | 7/2003 | Krupin et al. ............ 423/66 |
| 6,764,669 B2 | * | 7/2004 | Isaka et al. ............. 423/464 |
| 6,800,268 B2 | * | 10/2004 | Uchino et al. .......... 423/464 |
| 2005/0013765 A1 | * | 1/2005 | Thomas et al. .......... 423/592.1 |

FOREIGN PATENT DOCUMENTS

| | | |
|---|---|---|
| JP | 49-032897 | 3/1974 |
| JP | 58-176128 | 10/1983 |
| JP | 62-158118 | 7/1987 |
| JP | 64-31937 | 2/1989 |
| JP | 1-115820 | 5/1989 |
| JP | 2000-327330 | 11/2000 |
| JP | 2001-146424 | 5/2001 |
| JP | 2001-180935 | 7/2001 |
| JP | 2001-329321 | 7/2001 |
| JP | 2001-213626 | 8/2001 |

* cited by examiner

*Primary Examiner*—Ngoc-Yen Nguyen
(74) *Attorney, Agent, or Firm*—Jordan and Hamburg LLP

(57) ABSTRACT

The present invention provides a method enabling the high purification of a niobium compound and/or tantalum compound in a simplified manner at a low cost. This is accomplished by providing a method enabling the high purification of a niobium compound and/or tantalum compound comprising the steps of preparing a solution containing niobium and/or tantalum, allowing a precipitate comprising niobium and/or tantalum to develop, separating the precipitate by filtration from the filtrate, converting the precipitate to a liquid melt or taking the filtrate, and separating a niobium compound from a tantalum compound or vice versa by utilizing the difference in solubility to the solvent between the niobium compound and the tantalum compound.

6 Claims, No Drawings

PURIFICATION METHOD FOR PRODUCING HIGH PURITY NIOBIUM COMPOUND AND/OR TANTALUM COMPOUND

TECHNICAL FIELD

The present invention relates to a method for obtaining a highly pure niobium compound and/or tantalum compound.

BACKGROUND ART

Niobium has been used as an additive to steel because niobium is effective in stabilizing carbon in steel and prevents the progression of corrosion among particles. A niobium alloy has been used as a material of a conductive tube attached to the light emitting portion of a high-pressure sodium lamp, a superconductive material and an additive to a super alloy. Recently, demand for niobium oxide is notable because niobium has been widely used in electronic and optical fields. Particularly in those fields, highly pure niobium is indispensable. Purification of niobium compounds has been achieved by various methods depending on the niobium compounds serving as starting materials. For example, the purification of niobium oxide has been achieved by differential crystallization, solvent extraction, ion-exchange resin-based separation, distillation, etc. However, ores used for the extraction of niobium such as columbite or niocalite contain tantalum together with niobium. Moreover, since niobium shares many physical and chemical properties with tantalum, it has been extremely difficult to separate niobium from tantalum. Accordingly, many methods proposed heretofore include extracting metallurgical products containing the two elements in combination from ores.

For example, according to a method disclosed in U.S. Pat. No. 2,962,327, ore containing both niobium and tantalum is ground to a powder which is treated with an acid mixture comprising hydrofluoric acid and mineral acid, e.g., sulfuric acid, so that niobium and tantalum are dissolved in the acid mixture together with other metal impurities such as iron, manganese, calcium, rare earth elements, etc. The solution is allowed to contact with an organic solvent such as ketone, ester or ether of a lower fatty acid, particularly methyl-isobutyl-ketone, and niobium and tantalum are extracted through the organic phase.

According to a second method disclosed in a published Japanese Patent Application, Publication No. S58(1983)-176128, the solution described above is allowed to pass over an F-type anion-exchange resin layer to allow niobium and tantalum to be adsorbed to the resin layer, thereby separating the two elements from other metal impurities. Then, the two elements are dissolved in aqueous solutions of hydrofluoric acid and ammonium chloride to be recovered later.

Various processes for separating niobium from tantalum have been investigated. One such conventional process consists of separating the two elements dissolved in an aqueous solution based on the difference in their concentrations of salting-out and hydrogen ions. Specifically, when the concentrations of hydrofluoric acid and mineral acid constituting an acid mixture dissolving niobium and tantalum compounds are reduced, $NbF_7^{2-}$ is converted into $NbOF_5^{2-}$ while $TaF_7^{2-}$ stays unchanged, and thus it is possible to selectively extract tantalum using an organic solvent such as methyl-isobutyl-ketone. Alternatively, it is also possible by a process contrary to the above to extract tantalum and niobium using an organic solvent and then to selectively extract niobium using an acidic aqueous solution.

However, as discussed in a published Japanese Patent Application, Publication No. S62(1987)-158118, even if these methods are carried out, it is difficult to completely separate niobium from tantalum because methyl-isobutyl-ketone itself dissolves measurably in water. Thus, to achieve the complete separation, it is necessary to wash the water phase with methyl-isobutyl-ketone through a series of mixing-settling steps.

A yet another method is disclosed in a published Japanese Patent Application, Publication No. S64(1989)-31937. The method includes the use of a porous support made of active carbon or polypropylene to which an oxygen-containing organic solvent such as trioctylphosphine oxide or an organic solvent chosen from alkylamines in which the alkyl group has four or more carbon atoms is attached or linked, and comprises the step of flowing an acidic aqueous solution containing the two elements over the support so that only tantalum is adsorbed to the support and separated from the acidic solution. However, it is difficult to obtain a support to which an organic solvent is linked. Alternatively, if the organic solvent is impregnated into a porous support, dissolution of the organic solvent to the water phase poses a problem.

The present inventors established a technique enabling the obtainment of a highly pure niobium compound and/or tantalum compound in a more simplified manner at a lower cost than are possible with the conventional methods.

DISCLOSURE OF THE INVENTION

The present invention provides a method enabling the high purification of a niobium compound, the method comprising dissolving a niobium compound in a solvent, allowing the niobium compound to be precipitated, and then isolating the niobium compound.

Specifically, the present invention provides a method enabling the high purification of a niobium compound and/or tantalum compound, the method comprising dissolving a niobium and/or tantalum compound in a solvent, selectively obtaining the niobium and/or tantalum compound as a precipitate, liquid melt or filtrate, and isolating the niobium and/or tantalum compound utilizing the difference in their solubility to the solvent.

In the following, a system comprising niobium oxide dissolved in an aqueous solution of hydrofluoric acid is taken as an illustrative example to show how the precipitation and isolation steps should be carried out according to the method of the invention. However, the precipitation step is not limited to the system based on an aqueous solution of hydrofluoric acid, but can be applied similarly effectively to other systems based on aquatic solvents or organic solvents. This also applies to the isolation step. Naturally, the system may comprise one chosen from various niobates. Needless to say, in order to obtain a highly pure niobium compound sought, the method can deal not only with a crystal solid obtained via the precipitation/isolation steps, but with a filtrate.

Specifically, an aqueous solution of hydrofluoric acid containing niobium oxide is prepared, the niobium oxide is allowed to precipitate, for example, by cooling the solution, fluoro niobic acid ($H_2NbF_7$) or oxyfluoro niobic acid ($H_2NbOF_5$) is obtained as a crystal, being efficiently separated from metal impurities such as Fe, Ni, Ti, etc. To the crystal of the niobium compound or solution containing the niobium compound, an alkali may be added so that a potassium fluoride salt or ammonium fluoride salt of niobium and/or tantalum is obtained.

The present invention provides a method enabling the high purification of a niobium compound, the method utilizing the difference of the alkali salts of niobium and tantalum in their solubility to a solvent.

Needless to say, it is also possible to selectively extract a highly pure tantalum compound from a solution containing a crude tantalum compound by using the same method as above.

BEST MODE FOR CARRYING OUT THE INVENTION

According to the method of the present invention, it is possible to use, as a starting material, a crude niobium compound such as ore that contains a low purity of niobium, or a niobium compound sold in the market for industrial use. A niobium compound containing niobium at about 99% is preferably used as a starting material, because then it is possible to easily obtain a highly pure niobium compound with a purity of 99.99% (4N) or higher at a sufficiently low cost as to make the industrialization of this niobium-purification process advantageous.

The present method provides a method enabling the high purification of a niobium compound, the method comprising dissolving a niobium compound in a solvent, and precipitating and isolating the compound.

In the following, a system comprising niobium oxide dissolved in an aqueous solution of hydrofluoric acid is taken as an illustrative example to show how the precipitation and isolation steps should be carried out according to the method of the invention. However, the precipitation step is not limited to the system based on an aqueous solution of hydrofluoric acid, but can be applied similarly effectively to other systems based on aquatic solvents or organic solvents. This also applies to the isolation step. Naturally, the system may comprise one chosen from various niobates. Needless to say, in order to obtain a highly pure niobium compound sought, the method can deal not only with a crystal solid obtained via the precipitation/isolation steps, but with a filtrate.

Specifically, according to the inventive method, niobium oxide is slowly added to hydrofluoric acid to be dissolved there. The solvent may comprise an acid mixture obtained by adding sulfuric acid or nitric acid to hydrofluoric acid so that impurities become more soluble to the resulting acid mixture after the precipitation of the target compound than is possible with hydrofluoric acid alone.

The niobium compound in the aqueous solution exists as fluoro niobic acid or oxyfluoro niobic acid, and its selective precipitation enables its separation from other metal impurities as well as tantalum or a member of the same element family. Specifically, the impurities are transferred to the liquid phase while the precipitate is recovered to be purified, which enables the simplified purification of the niobium compound.

It is possible to obtain an alkali fluoroniobate containing niobium at a purity of 99.99% (4N) by introducing the isolation step subsequent to the precipitation step. The isolation step uses a salt represented by a general formula MX (where M represents an alkali metal, alkali-earth metal or the like, and X represents halogen, carbonic, nitric, sulfuric or phosphoric ion), and utilizes the difference in solubility of the niobium compound and the tantalum compound (products obtained by reacting the niobium and tantalum compound with MX) to the solvent for their separation.

Since it is possible according to the inventive method to easily prepare a hydrogen fluoroniobate solution, the method is industrially advantageous. Fluoro niobic acid ($H_2NbF_7$) or oxyfluoro niobic acid ($H_2NbOF_5$) can be selectively precipitated, for example, by cooling the system, and thus it is efficiently separated from other metal impurities such as Fe, Ni, Ti, etc. Even if the system contains a tantalum compound, the isolation step separates niobium from tantalum by utilizing the difference in solubility to the solvent between alkali-metal niobate and alkali-metal tantalate. Thus, it is possible to easily recover a highly pure niobium compound from an aqueous solution containing the selectively enriched niobium compound. In contrast with the solvent extraction which requires the selection of an appropriate organic solvent and adjustment of the acid concentration, the present method can ensure the obtainment of a highly pure niobium compound without requiring such selection and subtle adjustment. Specifically, the isolation step involves the use of MX to produce therewith the niobium compound. Even if the system contains tantalum or a kin belonging to the same element family, it is possible to separate niobium from tantalum, i.e., to obtain a highly pure niobium compound by utilizing the difference in solubility to the solvent between the niobium compound and the tantalum compound. With regard to this particular system, since the tantalum compound is more insoluble to the solvent, it tends to precipitate while the niobium compound of interest stays dissolved in the solvent. Thus, to obtain the niobium compound of interest it is necessary to deal with the filtrate left after the filtration of the precipitate. Needless to say, to improve the purity of the niobium compound, the isolation step may be repeated. It is possible according to the inventive method to reduce the coexistent content of tantalum or a kin belonging to the same element family to <0.5 ppm.

When an aqueous solution of ammonium fluoroniobate is subjected to alkali treatment, niobium hydroxide insoluble to the solvent is produced. It is possible to obtain highly pure niobium oxide by firing niobium hydroxide. Needless to say, according to the inventive method, it is possible to obtain not only highly pure niobium oxide but highly pure lithium niobate ($LiNbO_3$), highly pure potassium fluoroniobate ($K_2NbF_7$), highly pure niobium metal, and other highly pure niobium compounds including niobium-containing salts.

It is also possible to purify tantalum by the same method as used for the purification of niobium. For example, it is possible to obtain highly pure tantalum oxide. It is also possible to obtain highly pure lithium tantalate ($LiTaO_3$), potassium fluorotantalate ($K_2TaF_7$), tantalum metal (Ta) and other tantalum compounds including tantalum-containing salts.

According to the method of the present invention, it is possible to use, as a starting material, a crude niobium compound such as niobium-containing ores, or a niobium compound sold in the market for industrial use. A niobium compound containing niobium at about 99% is preferably used as a starting material, because then it is possible to easily obtain a highly pure niobium compound with a purity of 99.99% (4N) or higher at a sufficiently low cost as to make the industrialization of this niobium-purification process advantageous.

One feature of the inventive method consists, for example, in neutralizing an acidic niobium compound with an alkali to turn it into niobium hydroxide, and firing it to obtain highly pure niobium oxide. If it is required to strictly eliminate the contamination of metal impurities, ammonia or aqueous solution of ammonia, or ammonium carbonate or ammonium bicarbonate is preferably added to the system.

A second feature of the inventive method consists in applying potassium fluoride or potassium carbonate to the system, to produce thereby potassium fluoroniobate ($K_2NbF_7$). If the niobium product exists as a precipitate, its recovery may be achieved by any known method such as pressurized filtration, press-filtering, centrifuge-filtration, etc.

A third feature of the inventive method consists in applying an alkali to the system to cause a highly pure niobium compound to melt, which enables the production of highly pure niobium metal. Needless to say, it is also possible to obtain a highly pure niobium compound in the form of a metal salt of niobium, e.g., lithium niobate ($LiNbO_3$). It is possible by using such a highly pure niobium compound obtained by the above method as a starting material to isolate highly pure niobium metal which can be used as a highly functional material in various high-standard fields including electronics and optics.

A notable feature of the inventive method consists in the simplified purification of a niobium compound. The inventive method aims to achieve the high purification of a niobium compound by employing, roughly, two steps, that is, (1) dissolving step, and (2) isolation steps, or more specifically three steps, that is, (1) dissolving step, (2) precipitation step and (3) isolation step. Particularly, the precipitation step which is introduced as a primary treatment to help a niobium compound to be separated from impurities ensures the simplified purification of the niobium compound which is also achievable at an industrial scale. If the system contains tantalum together with niobium, it is possible to separate niobium from tantalum by the isolation step which utilizes the difference in solubility to the solvent between potassium fluroniobate and potassium fluorotantalate, or between ammonium fluoroniobate and ammonium fluorotantalate.

Needless to say, the precipitation step is applied not only to the hydrofluoric solution-based system but to other systems based on other aqueous solutions and organic solvents. This also applies for the isolation step. Needless to say, these steps are applicable to various salts of niobium. Needless to say, the precipitation and isolation steps may be applied not only to precipitates but also to filtrates, as long as the application contributes to the improved purification.

Needless to say, it is also possible to purify tantalum by the same method as used for the purification of niobium.

EXAMPLES

The present invention will be further illustrated by means of Examples in which a niobium compound is dissolved in hydrofluoric acid. However, the present invention is not limited to those examples.

Example 1

To a transparent PFA-made 1 L-volume vessel equipped with a stirrer, was transferred 500 g of HF, to which was added at 50° C. with stirring 150 g of niobium oxide containing metal impurities as shown in Table 1. Then, the insoluble residue was filtered out, and a solution of niobium in hydrofluoric acid containing niobium at about 300 g/L was obtained.

The solution of niobium in hydrofluoric acid was kept with stirring at −20° C. for two hours, to allow a niobium compound to precipitate. The precipitate was recovered by filtration, and to 450 g of this recovered precipitate was added 150 g of potassium fluoride. The reaction was allowed to proceed by stirring for 30 minutes. The reaction system was kept at −15° C. for a sufficiently long time as to allow a niobium compound to completely precipitate. The isolation step utilizing solubility difference was introduced, and the precipitate was separated by filtration from the filtrate. The filtrate was heated/concentrated by being exposed to a hot water bath, to provide a solid. The solid was dissolved in hydrofluoric acid anhydride, and allowed to precipitate, to provide potassium fluoroniobate.

The potassium fluoroniobate product was analyzed by inductively coupled plasma-atomic emission spectroscopy (ICP-AES), and the impurities it contained were found to be as shown in Table 1.

Comparative Example 1

To a transparent PFA-made 1 L-volume vessel equipped with a stirrer, was transferred 500 g of HF, to which was added at 50° C. with stirring 150 g of niobium oxide containing metal impurities as shown in Table 2. Then, the insoluble residue was filtered out, and a solution of niobium in hydrofluoric acid containing niobium at 300 g/L was obtained.

Then, to 450 g of the aqueous solution of niobium in hydrofluoric acid was added 150 g of potassium carbonate, and the system was stirred for 30 minutes and cooled to −15° C. to allow a precipitate to develop. The precipitate was separated by filtration from the filtrate. The filtrate was heated/concentrated to provide a solid. The solid was dissolved in hydrofluoric acid anhydride, and was allowed to precipitate to provide potassium fluoroniobate.

The potassium fluoroniobate product was analyzed by ICP-AES, and the impurities it contained were found to be as shown in Table 2.

Example 2

To a transparent PFA-made 1 L-volume vessel equipped with a stirrer, were transferred 200 g of niobium crystal and 40 g of pure water, and the mixture was stirred for 15 minutes. To the mixture was added at room temperature 118 g of a 40 wt % aqueous solution of ammonium fluoride, and the resulting mixture was stirred for 30 minutes. Then, the system was kept at −20° C. for two hours to allow a precipitate to develop. The precipitate was separated by filtration from the filtrate. To the filtrate was added a 28% aqueous solution of ammonia to allow a niobium compound now converted into niobium hydroxide to precipitate. The precipitate was recovered by filtration being separated from ammonium fluoride and other elements, to provide niobium hydroxide. The niobium hydroxide was fired at 1000° C. in an electric furnace to provide niobium oxide. The obtained niobium oxide product was analyzed by ICP-AES which showed that the impurities contained in the product were as shown in Table 3.

Then, to 450 g of the solution of tantalum in hydrofluoric acid was added 150 g of potassium fluoride, and the mixture was stirred for 30 minutes. The system was kept at −15° C. to allow a precipitate to develop. The precipitate was separated by filtration from the filtrate. Then, the precipitate was dried to provide potassium fluorotantalate in the form of crystal.

The obtained potassium fluorotantalate product was analyzed by ICP-AES which showed that the impurities contained in the product were as shown in Table 4.

TABLE 1

| Example 1 | Impurity content (ppm) | | | | | |
| --- | --- | --- | --- | --- | --- | --- |
|  | Ta | Ti | Fe | Ni | Al | Sb |
| $Nb_2O_5$ Starting material | 2300 | 1290 | 440 | 70 | 40 | 30 |
| Precipitate | 590 | 15 | 15 | 2 | 6 | 2 |
| Final product | <0.5 | <0.5 | <0.5 | <0.5 | <0.5 | <0.5 |

The numerals represent weights relative to the weight of Nb.

TABLE 2

| Comparative Example 1 | Impurity content (ppm) | | | | | |
| --- | --- | --- | --- | --- | --- | --- |
|  | Ta | Ti | Fe | Ni | Al | Sb |
| $Nb_2O_5$ Starting material | 2300 | 1290 | 440 | 70 | 40 | 30 |
| Final product | 120 | <1 | <1 | <1 | <0.5 | <0.5 |

The numerals represents weights relative to the weight of Nb.

TABLE 3

| Example 2 | Impurity content (ppm) | | | | | |
| --- | --- | --- | --- | --- | --- | --- |
|  | Ta | Ti | Fe | Ni | Al | Sb |
| Precipitate | 590 | 15 | 15 | 2 | 6 | 2 |
| Final product | <1 | <1 | <0.5 | <0.5 | <0.5 | <0.5 |

The numerals represent weights relative to the weight of Nb.

INDUSTRIAL APPLICABILITY

It is possible according to the inventive method to easily obtain a highly pure niobium compound containing niobium at 99.99% (4N) or higher by using, as a starting material, niobium-containing ore or a niobium compound product for industrial use commercially available or preferably, a niobium compound at about 99%. The method will be advantageous even if it is carried out at an industrial scale, because of its cost being sufficiently low.

The invention claimed is:

1. A process for producing a highly pure niobium compound comprising:
   crystallizing fluoro niobic acid ($H_2NbF_7$) crystals or oxyfluoro niobic acid ($H_2NbOF_5$) crystals from a fluoro niobic acid ($H_2NbF_7$) solution or an oxyfluoro niobic acid ($H_2NbOF_5$) solution including Ta as an impurity;
   dissolving the resulting crystals in an alkali salt solution to form a precipitate comprising Ta and a liquid phase comprising a highly pure niobium compound;
   separating said precipitate from said liquid phase; and
   recovering the highly pure niobium compound from said liquid phase.

2. A process according to claim 1, wherein said fluoro niobic acid ($H_2NbF_7$) solution is made by dissolving niobium oxides in HF solution.

3. A process according to claim 1, wherein said alkali salt solution comprises a halogen salt, $CO_2$ salt, $NO_3$ salt, $SO_4$ salt or $PO_5$ salt.

4. A process for producing a highly pure tantalum compound comprising:
   crystallizing fluoro tantalic acid ($H_2TaF_7$) crystals from a fluoro tantalic acid ($H_2TaF_7$) solution including Nb as an impurity; and
   dissolving the resulting crystals in an alkali salt solution to form a precipitate comprising a highly pure tantalum compound and a liquid phase comprising a niobium compound; and
   separating said precipitate from said liquid phase.

5. A process according to claim 4, wherein said fluoro tantalic acid ($H_2TaF_7$) solution is made by dissolving tantalum oxides in HF solution.

6. A process according to claim 4, wherein said alkali salt solution comprises a halogen salt, $CO_2$ salt, $NO_3$ salt, $SO_4$ salt or $PO_5$ salt.

* * * * *